J. S. FISHER.
Razor-Strop.
No. 198,592. Patented Dec. 25, 1877.
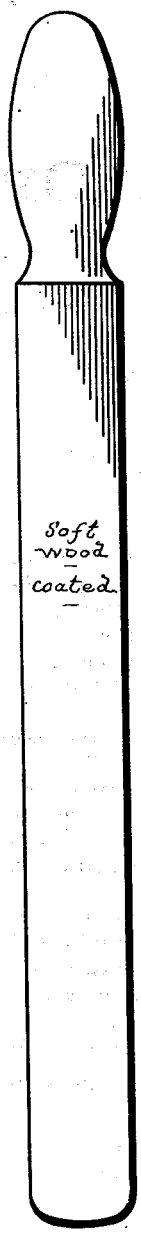
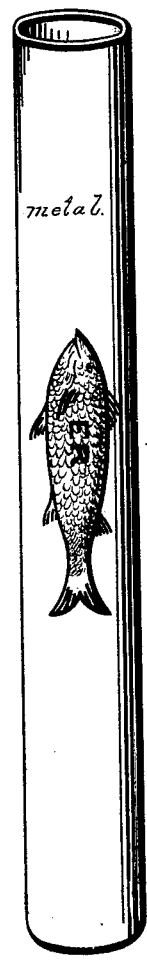
Witnesses:
Lewis F. Brous?
John A. Diederhein
Inventor:
Joseph S. Fisher
by J. M. Moyer
Attorney.

UNITED STATES PATENT OFFICE.

JOSEPH S. FISHER, OF PHILADELPHIA, PENNSYLVANIA.

IMPROVEMENT IN RAZOR-STROPS.

Specification forming part of Letters Patent No. 198,592, dated December 25, 1877; application filed October 15, 1877.

*To all whom it may concern:*

Be it known that I, JOSEPH S. FISHER, of the city of Philadelphia, in the county of Philadelphia and State of Pennsylvania, have invented a new and Improved Strop for Sharpening Razors; and I hereby declare that the following is a full and exact description thereof, reference being had to the drawings, in which—

Figure 1 represents the strop, and Fig. 2 the metallic sheath.

The nature of my invention consists of a wooden base, oiled and coated with an abrasive composition containing a fatty or oily substance, with a metallic case, as and for the purposes set forth.

The base consists of a soft and porous wood, of the size of an ordinary razor-strop—the specimen herewith being poplar wood, eleven inches in length, one inch wide, and one-fourth of an inch thick. Both sides are furrowed and roughed, and thoroughly saturated with Cosmoline lubricating-oil, said oil consisting of an unscorched residuum of petroleum of 320° fire-test and 30° Baumé gravity. I then apply on the one side a paste consisting of crocus and vermilion powder, mixed with mutton-suet and bees-wax, and on the other side I apply a paste the ingredients of which are plumbago, lamp-black, mutton-suet, and bees-wax, and I protect the strop with a metallic sheath.

The base being soft and porous, and thoroughly saturated with the oil, and being covered with the paste herein described, becomes self-lubricating, and the metallic case, being a non-absorbent, preserves a complete moisture, and produces a neat, durable, and effective razor-strop.

What I claim as my invention, and desire to protect and secure by Letters Patent, is—

The wooden base coated with an abrasive composition, containing a fatty or oily substance, and covered with a metallic sheath, as and for the purposes hereinbefore set forth.

JOS. S. FISHER.

Witnesses:
  WILLIAM RICKEY,
  ALEXANDER RICKEY.